(12) United States Patent
Lee et al.

(10) Patent No.: US 7,360,622 B2
(45) Date of Patent: Apr. 22, 2008

(54) DIFFERENTIAL MOUNTING STRUCTURE

(75) Inventors: Seung-Hak Lee, Suwon-si (KR);
Hyun-Ju Bae, Suwon-si (KR);
Byong-Cheol Kim, Seoul (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 416 days.

(21) Appl. No.: 11/243,029

(22) Filed: Oct. 4, 2005

(65) Prior Publication Data

US 2006/0076179 A1    Apr. 13, 2006

(30) Foreign Application Priority Data

Oct. 7, 2004    (KR)    ............... 10-2004-0079885

(51) Int. Cl.
*B60K 17/00* (2006.01)
*F16L 23/00* (2006.01)
(52) U.S. Cl. ............... 180/377; 180/291; 285/62; 285/405
(58) Field of Classification Search ............... 180/378, 180/377, 291, 292, 312; 185/142.1, 205, 185/208, 213; 267/2, 140.11, 140.12; 285/139.1, 285/142.1, 62, 368, 412, 414, 405
See application file for complete search history.

(56) References Cited

U.S. PATENT DOCUMENTS

| | | | | |
|---|---|---|---|---|
| 1,290,709 | A * | 1/1919 | Bruah | 180/16 |
| 3,469,649 | A * | 9/1969 | Sampietro et al. | 180/352 |
| 3,497,028 | A * | 2/1970 | Sampietro | 180/352 |
| 3,601,425 | A * | 8/1971 | Sampietro et al. | 280/124.166 |
| 5,542,707 | A * | 8/1996 | Kamei et al. | 280/834 |
| 5,884,723 | A * | 3/1999 | Kleinschmit et al. | 180/360 |
| 7,083,024 | B2 * | 8/2006 | Bergman et al. | 180/291 |
| 2001/0001524 | A1 * | 5/2001 | Rocheleau | 285/368 |
| 2005/0061573 | A1 * | 3/2005 | Mizuno et al. | 180/376 |

FOREIGN PATENT DOCUMENTS

DE    102 29 757    1/2004

* cited by examiner

*Primary Examiner*—Joe H. Cheng
*Assistant Examiner*—Nicole Verley
(74) *Attorney, Agent, or Firm*—Morgan Lewis & Bockius LLP

(57) ABSTRACT

A differential mounting structure includes a pipe into which a bushing coupled to the differential is forcibly inserted. The pipe is inserted into a through hole of a cross member and is fixedly attached at one end thereof to a flange. Coupling bolts penetrating the flange are connected to nuts welded to the cross member. When the bushing used for installing the differential to the vehicle body is worn down and can no longer do its job, only the bushing mounting assembly is replaced or repaired in the present invention.

9 Claims, 6 Drawing Sheets

DIFFERENTIAL MOUNTING STRUCTURE

CROSS-REFERENCE TO RELATED APPLICATIONS

The present application is based on, and claims priority from, Korean Application Serial Number 10-2004-0079885, filed on Oct. 7, 2004, the disclosure of which is hereby incorporated by reference herein in its entirety.

FIELD OF THE INVENTION

The present invention relates to a differential used in a vehicle or the like and, more particularly, to a differential mounting structure adapted to easily install the differential to a rear cross member of the vehicle body via bolts and nuts.

BACKGROUND OF THE INVENTION

Four-wheel drive (4WD) or rear-wheel drive (RWD) vehicles are generally equipped with a differential to transmit torque to the rear wheels of the vehicle. The differential is conventionally supported by being mounted to the vehicle body via a bushing.

The differential is usually located between first and second cross members that form the vehicle body by being welded to the vehicle body frame, and each first and second cross member is attached with a pipe by way of welding. The pipe is forcibly inserted by the bushing coupled to the differential. Thus, the differential typically is coupled to and supported by the cross members via rubber bushings.

However, when the rubber bushings need replacing due to wear and tear or the like, the entire vehicle body frame including the cross member should be replaced as the pipe and cross member are coupled together by welding. Therefore, some frame vehicles have a rear cross member module coupled to the vehicle body frame via bolts or the like for facilitating the attachment and detachment of the rear cross member module. However, the entire rear cross member module should still be removed for replacing the worn down bushing, resulting in excessive maintenance costs, time consumption, and deterioration of the working efficiency.

The identical drawback is prevalent in most monocoque type vehicles during maintenance.

During the vehicle assembly, the pipe is inserted and welded to the cross member. Next, the bushing is forcibly inserted into the pipe. However, since the pipe is pre-installed at the cross member, a large jig is required for an accurate insertion of the bushing, causing a complicated and inefficient assembly process.

SUMMARY OF THE INVENTION

Embodiments of the present invention permit replacement or repair of only the bushing mounting assembly when the bushing used for installing the differential to the vehicle body is worn down and can no longer do its job. Thus, the replacement or maintenance of the bushing is facilitated and performed at low cost. Further, the assembly of the bushing is executed in a simple mechanical coupling process, thereby simplifying the assembly process, reducing the material cost and improving the working efficiency.

A differential mounting structure according to an embodiment of the present invention includes a pipe into which a bushing coupled to the differential is forcibly inserted. The pipe is inserted into a through hole formed at a cross member and is fixedly attached at one end thereof to a flange. Coupling bolts penetrating the flange are connected to nuts welded to the cross member. The through hole at the front surface of the cross member is preferably larger in diameter than the outer diameter of the pipe. Thus, a clearance is formed between the outer wall of the through hole and the outer wall of the pipe.

A rubber packing may be inserted through the clearance between the pipe and the through hole formed at the front surface of the cross member and is mounted on the outer wall of the cross member formed with the through hole. A guide may be inserted through the clearance between the pipe and the through hole formed at the front surface of the cross member and is coupled via a bolt to the cross member formed with the through hole.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
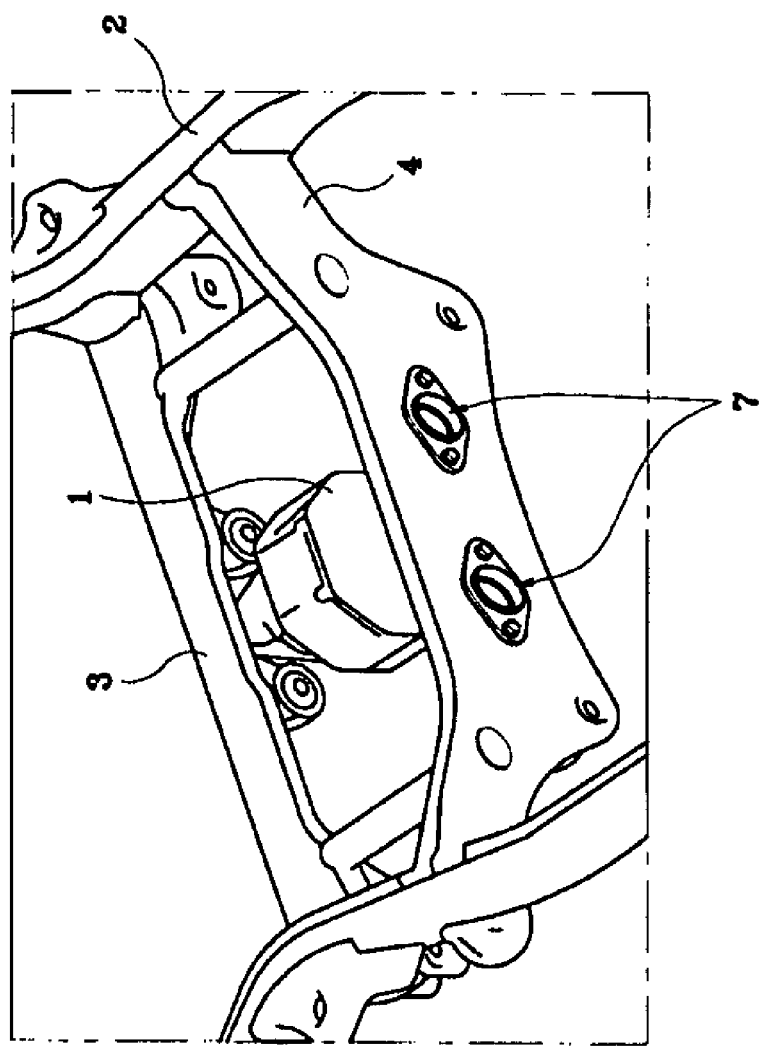
FIG. 1 is a perspective view of a differential installed to cross members according to a first embodiment of the present invention.

Referring to FIG. 1, an embodiment of the present invention includes a differential 1 disposed between a first cross member 3 and second cross member 4 that form the vehicle body by coupling to a vehicle body frame 2 via welding. Differential 1 is coupled to and supported by first and second cross members 3 and 4 via bushing mounting assemblies 7.

Figure 2:
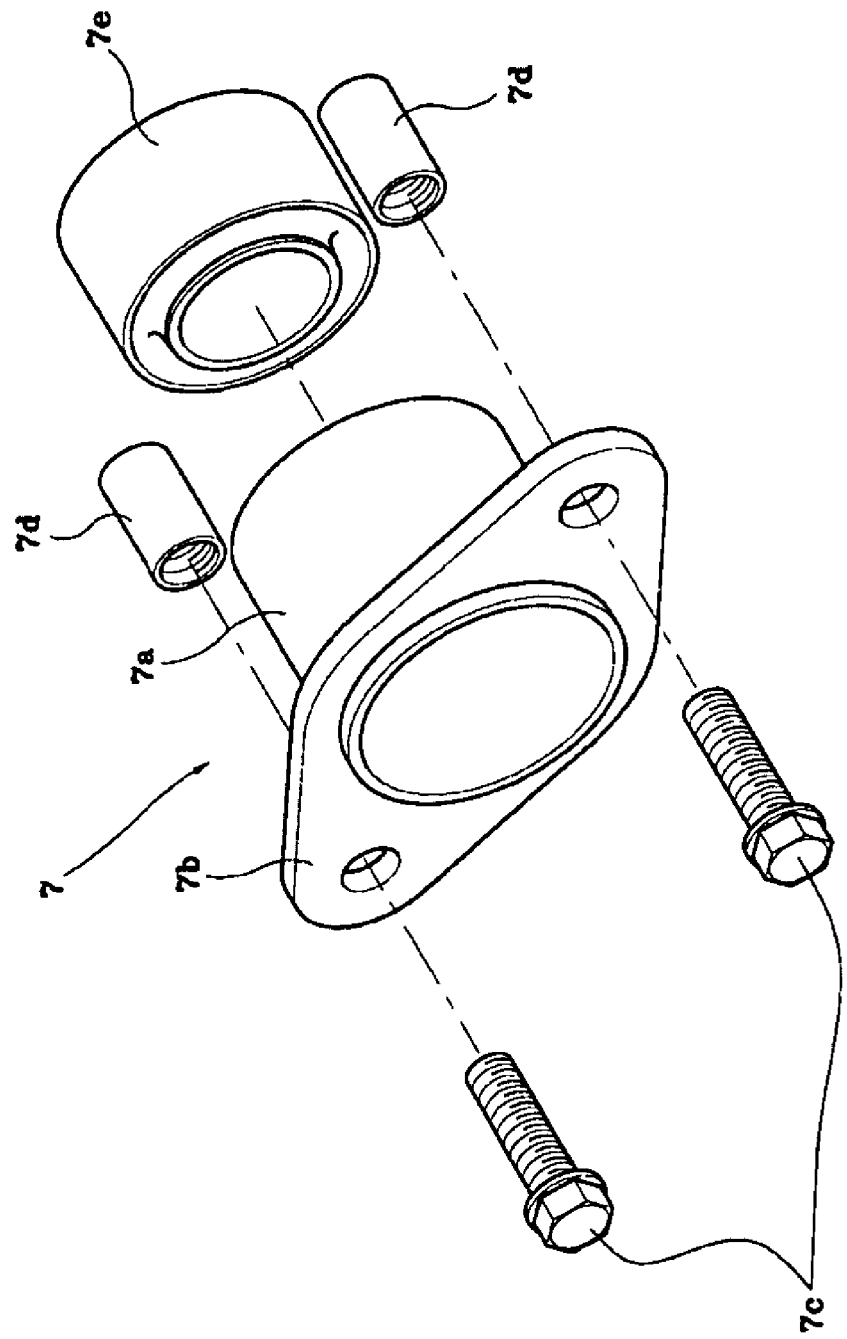
FIG. 2 is a disassembled perspective view of a bushing mounting assembly according to a first embodiment of the present invention.

With reference to FIG. 2, bushing mounting assembly 7 includes a pipe bracket composed of a cylindrical pipe 7a opened at both ends thereof and a flange 7b attached to the upper end of pipe 7a. Coupling bolts 7c are inserted into coupling holes of the flange 7b, and pipe nuts 7d are coupled to coupling bolts 7c. A bushing 7e is forcibly pushed into pipe 7a.

Figure 3:
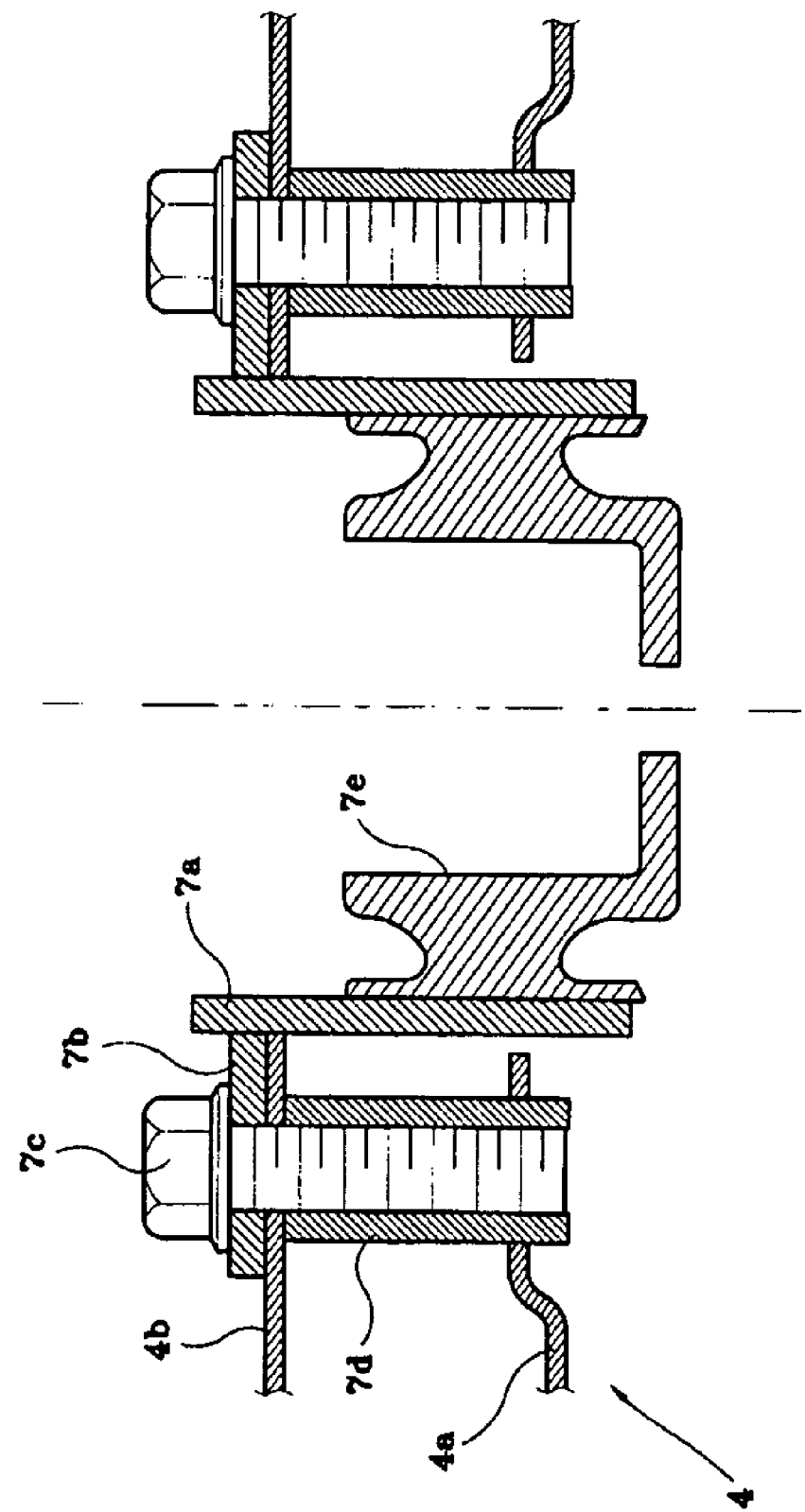
FIG. 3 is a cross sectional view of the bushing portion of FIG. 1.

FIG. 3 is a cross sectional view of bushing mounting assembly 7 mounted to second cross member 4. Second cross member 4 is formed with a through hole penetrating from the front to the rear surface thereof. Pipe nuts 7d may be secured by welding at both sides of the through hole. Pipe 7a is inserted into the through hole, and flange 7b of the pipe bracket is closely attached to the rear surface of second cross member 4.

Coupling bolts 7c are inserted into the coupling holes of the pipe bracket and are coupled with pipe nuts 7d. Bushing 7e made of rubber and forcibly inserted into pipe 7a is coupled to the differential and is supported by the cross member.

The through hole for inserting pipe 7a into second cross member 4 has a slightly larger diameter at a front surface 4a of second cross member 4 than the outer diameter of pipe 7a whereas the diameter of a rear surface 4b is almost identical to the outer diameter of pipe 7a. Therefore, while pipe 7a is inserted into the through hole, a clearance in a predetermined length is formed between the outer wall of the through hole and the outer wall of pipe 7a for preventing the differential from directly transmitting its vibration to the cross member during operation.

When required to be replaced or repaired, the bushing can easily be detached from the cross member by loosening coupling bolts 7c. This simplifies and facilitates the maintenance or replacement of the bushing and improves the working efficiency thereof. The bushing assembly also can easily be performed at low costs.

Figure 4:
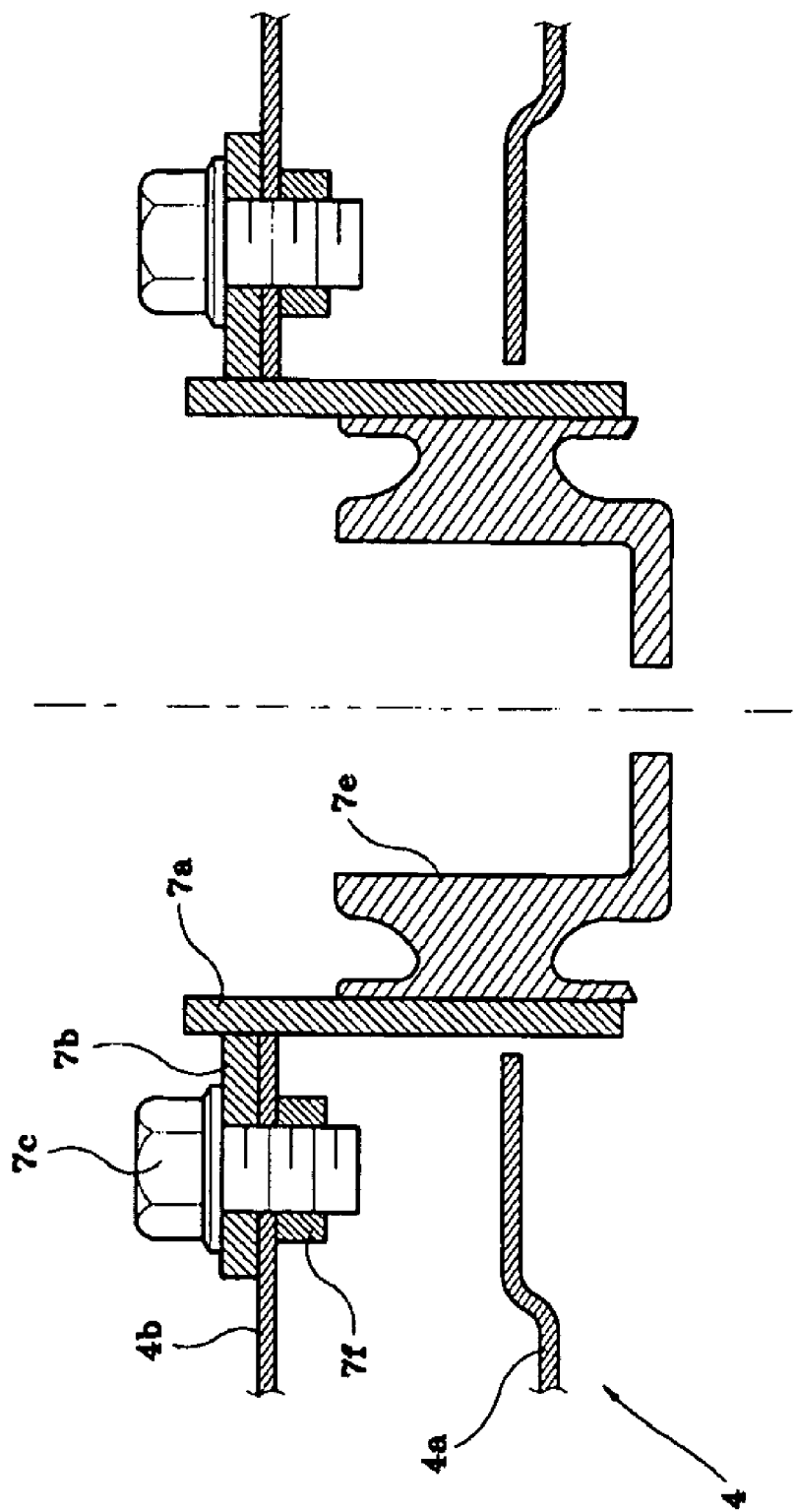
FIG. 4 is a cross sectional view corresponding to the bushing mounting assembly of FIG. 3 according to a second embodiment of the present invention.

For a second embodiment of the present invention, a welding nut 7f is fixed by way of welding at rear surface 4b of second cross member 4 (see FIG. 4). Welding nut 7f has a relatively shorter length than that of pipe nuts 7d in the first embodiment. The remaining constitutions may be essentially as those of the first embodiment, thereby enabling to reduce the weight and material cost of the components compared to the first embodiment.

Figure 5:
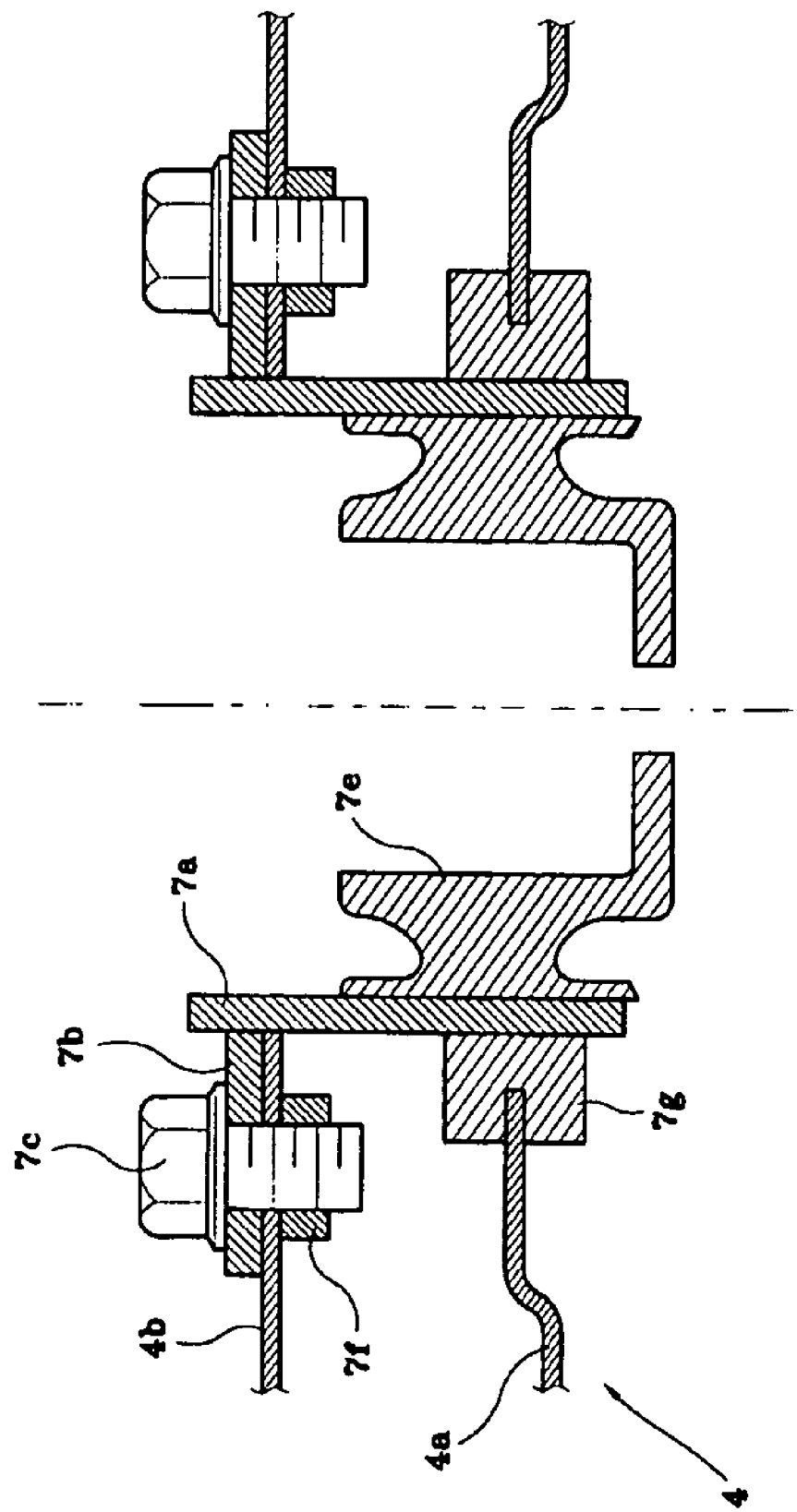
FIG. 5 is a cross sectional view corresponding to the bushing mounting assembly of FIG. 3 according to a third embodiment of the present invention.

For a third embodiment of the present invention, a rubber packing 7g may be mounted between the outer wall of the through hole and the outer wall of pipe 7a for insulating the vibration and noise transmission from the differential and improving the ride comfort of the vehicle thereby (see FIG. 5).

Figure 6:
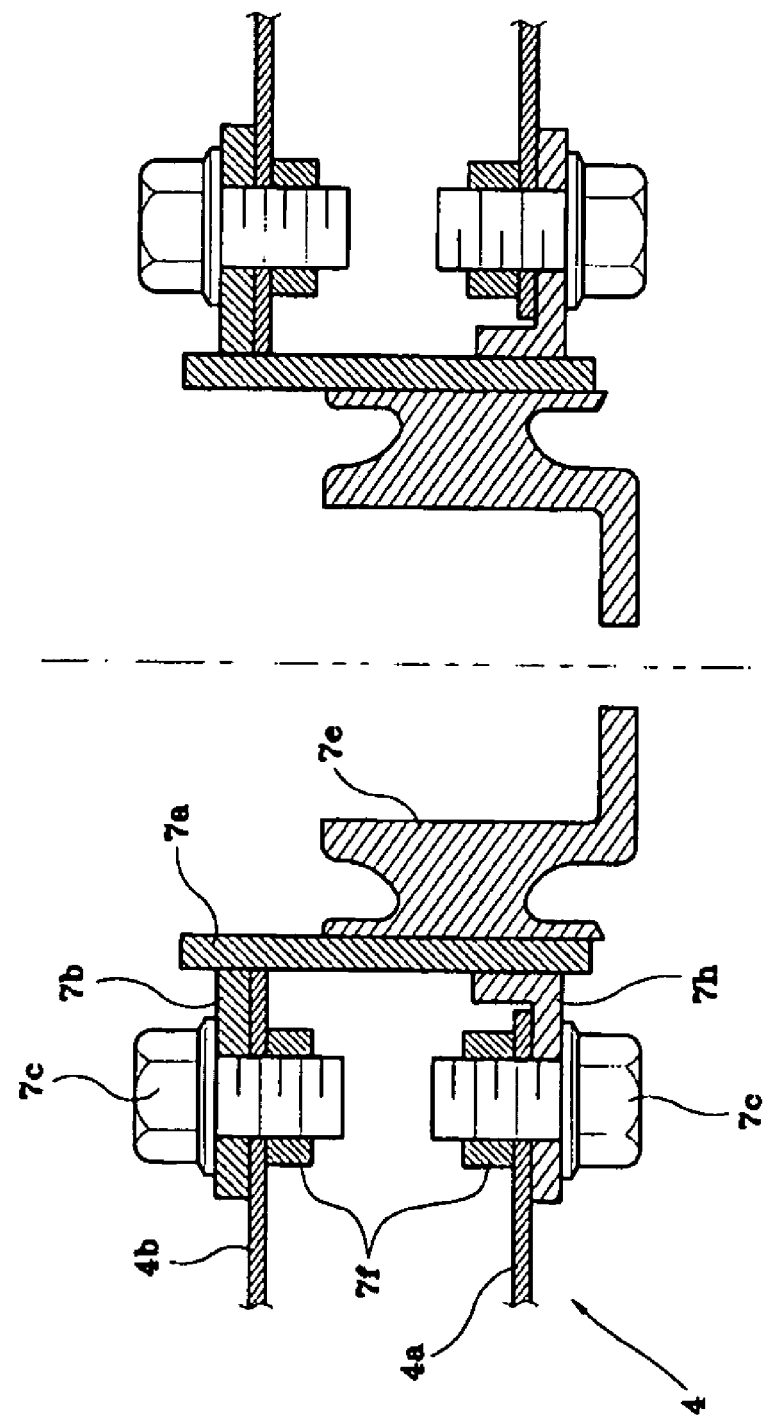
FIG. 6 is a cross sectional view corresponding to the bushing mounting assembly of FIG. 3 according to a fourth embodiment of the present invention.

For a fourth embodiment of the present invention, a guide 7h made of rubber or plastic may be positioned between the outer wall of the through hole and the outer wall of pipe 7a via welding nut 7f and coupling bolt 7c, thereby improving the efficiency of the vibration and noise insulation just like the third embodiment (see FIG. 6).

As apparent from the foregoing, there is an advantage in that the differential can easily be mounted to the cross member by coupling bolts, thus improving the maintenance, replacement or assembly of the bushing, and reducing the material cost and weight thereof.

What is claimed is:

1. A differential mounting structure, comprising:
   a pipe into which a bushing couplable to the differential is inserted, said pipe being configured and dimensioned for insertion into a hole in a cross member and fixedly attached at one end thereof to a flange; and
   coupling bolts penetrating said flange and connectable to threaded fastening portions secured with said cross member.

2. The structure as defined in claim 1, wherein said through hole at a front surface of said cross member is larger in diameter than the outer diameter of said pipe, thus forming a clearance between the outer wall of said through hole and the outer wall of said pipe.

3. The structure as defined in claim 2, wherein a rubber packing is inserted through the clearance between said pipe and said through hole formed at the front surface of said cross member and is mounted to the outer wall of said cross member formed with said through hole.

4. The structure as defined in claim 2, wherein a guide is inserted through the clearance between said pipe and said through hole formed at the front surface of said cross member and is coupled via a bolt to said cross member formed with said through hole.

5. The structure as defined in claim 1, wherein the bushing is force fit within the pipe.

6. The structure as defined in claim 1, wherein said threaded fastening portions comprise nuts welded to said cross member.

7. A differential mounting structure for mounting a differential to a vehicle cross member, comprising:
   a pipe having a flange at one end thereof with fastening holes therein, an opposite end of the pipe being configured and dimensioned for insertion into a hole in the cross member;
   a bushing force fit into said pipe;
   threaded fastening portions securable with the cross member in alignment with said flange fastening holes; and
   bolts configured and dimensioned for securing said pipe to the cross member via said fastening holes and said threaded fastening portions.

8. The structure of claim 7, wherein said threaded fastening portions comprise nuts fixable to the cross member.

9. The structure of claim 7, wherein said threaded fastening portions comprise threaded surfaces formed in said cross member.

* * * * *